(12) United States Patent
Liu et al.

(10) Patent No.: US 12,244,376 B2
(45) Date of Patent: Mar. 4, 2025

(54) BEAMFORMING SCHEME IN HIGHER RANK TRANSMISSION

(71) Applicant: NOKIA SOLUTIONS AND NETWORKS OY, Espoo (FI)

(72) Inventors: Di Liu, Beijing (CN); Chao Han, Beijing (CN); Pengpeng Song, Beijing (CN); Lili Wang, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/778,336

(22) PCT Filed: Sep. 1, 2020

(86) PCT No.: PCT/CN2020/112898
§ 371 (c)(1),
(2) Date: May 19, 2022

(87) PCT Pub. No.: WO2022/047631
PCT Pub. Date: Mar. 10, 2022

(65) Prior Publication Data
US 2023/0018285 A1    Jan. 19, 2023

(51) Int. Cl.
H04B 7/06    (2006.01)
H04B 7/0456    (2017.01)

(52) U.S. Cl.
CPC ......... H04B 7/0617 (2013.01); H04B 7/0456 (2013.01); H04B 7/0626 (2013.01)

(58) Field of Classification Search
CPC ... H04B 7/01; H04B 7/04; H04B 7/06; H04B 7/063; H04B 7/0408; H04B 7/0413;
(Continued)

(56) References Cited

U.S. PATENT DOCUMENTS

2009/0046570 A1  2/2009  Sarkar et al.
2011/0268050 A1  11/2011  Farajidana et al.
(Continued)

FOREIGN PATENT DOCUMENTS

CN    105103466 A    11/2015
CN    105308879 A    2/2016
(Continued)

OTHER PUBLICATIONS

International Search Report and Written Opinion dated May 27, 2021 corresponding to International Patent Application No. PCT/CN2020/112898.
(Continued)

*Primary Examiner* — Shawkat M Ali
(74) *Attorney, Agent, or Firm* — SQUIRE PATTON BOGGS (US) LLP

(57) ABSTRACT

Embodiments of the present disclosure relate to device, method, device and computer readable storage media of beam-forming scheme in higher rank transmission for massive multiple input multiple output system. The method comprises determining a target beam for carrying a transmission of a reference signal from the base station to the user equipment; determining a target arrangement of the plurality of ports formed at an antenna array of the base station; and transmitting, to the user equipment, different portions of the target beam through a plurality of ports based on the target arrangement. In this way, a new beamforming method when Massive-MIMO choose higher rank transmission in multi ports communication system is proposed. The gNB would only select the best beam with different halves in the same polarization to keep the QCL principles.

15 Claims, 6 Drawing Sheets

(58) Field of Classification Search
CPC .. H04B 7/0456; H04B 7/0617; H04B 7/0626; H04L 1/06; H04L 5/00; H04L 5/10; H04W 16/28; H04W 24/10; H04W 72/04; H04W 74/00; H04W 76/27
USPC ........ 370/203, 329; 375/219, 260, 267, 295, 375/316
See application file for complete search history.

(56) References Cited

U.S. PATENT DOCUMENTS

| | | | |
|---|---|---|---|
| 2015/0341099 A1* | 11/2015 | Kang | H04B 7/0634 375/267 |
| 2016/0013838 A1 | 1/2016 | Zhu et al. | |
| 2016/0056941 A1 | 2/2016 | Kang et al. | |
| 2016/0080052 A1 | 3/2016 | Li et al. | |
| 2016/0080058 A1 | 3/2016 | Kang et al. | |
| 2016/0182137 A1 | 6/2016 | Onggosanusi et al. | |
| 2016/0373178 A1* | 12/2016 | Nam | H04B 7/0639 |
| 2018/0054244 A1 | 2/2018 | Kim et al. | |
| 2018/0138590 A1 | 5/2018 | Uchida et al. | |
| 2018/0294856 A1 | 10/2018 | Faxér et al. | |
| 2019/0199496 A1* | 6/2019 | Qin | H04B 7/0617 |
| 2020/0059271 A1 | 2/2020 | Kuutela et al. | |
| 2020/0136711 A1* | 4/2020 | Cao | H04B 7/0691 |
| 2021/0391899 A1* | 12/2021 | Cao | H04L 5/0094 |

FOREIGN PATENT DOCUMENTS

| | | |
|---|---|---|
| CN | 105432026 A | 3/2016 |
| CN | 109391296 A | 2/2019 |
| JP | 2009-200824 A | 9/2009 |
| WO | 2010/050874 A1 | 5/2010 |
| WO | 2014/007511 A1 | 1/2014 |
| WO | 2014/071852 A1 | 5/2014 |
| WO | 2014/129858 A1 | 8/2014 |
| WO | 2015/016487 A1 | 2/2015 |
| WO | 2017/028006 A1 | 2/2017 |
| WO | 2020/157040 A1 | 8/2020 |

OTHER PUBLICATIONS

Extended European Search Report dated Mar. 27, 2023, corresponding to European Patent Application No. 20951879.4.
3GPP TSG RAN WG1 Meeting #91, ZTE Sanechips; "Remaining details on QCL", Reno, USA, Nov. 27-Dec. 1, 2017, R1-1719546.
3GPP TSG RAN WG1 Meeting 91, ZTE, Sanechips; "On CSI-RS for CSI acquisition and beam management", Reno, USA, Nov. 27-Dec. 1, 2017, Oct. 2017. R1-1719541.
"Analysis on Codebook Based Precoding and Eigen Based Beamforming in UTRAN LTE," Chunchang Tian et al., IEEE, 2009 5th International Conference on Wireless Communications, Networking and Mobile Computing, Oct. 30, 2009.
Chinese Office Action, with English language translation, corresponding to CN Application No. 202080070868.2, dated Dec. 20, 2024.

* cited by examiner

BEAMFORMING SCHEME IN HIGHER RANK TRANSMISSION

FIELD

Embodiments of the present disclosure generally relate to the field of telecommunication and in particular, to device, method, apparatus and computer readable storage medium of beamforming scheme in higher rank transmission for massive-Multiple Input Multiple Output (MIMO) system.

BACKGROUND

The massive-MIMO technology is one of the important solutions in increasing cell capability for 5G New Radio (NR) system. One of the schemes used for massive MIMO refers to the Grid of beam (GOB) scheme. Besides GOB scheme, Eigen beam based beamforming (EBB) is another scheme that is used in massive-MIMO.

SUMMARY

In general, example embodiments of the present disclosure provide a solution of beamforming scheme in higher rank transmission.

In a first aspect, there is provided a base station. The base station comprises at least one processor; and at least one memory including computer program codes; the at least one memory and the computer program codes are configured to, with the at least one processor, cause the base station at least to determine, at a base station, a target beam for carrying a transmission of a reference signal from the base station to the user equipment; determine a target arrangement of the plurality of ports formed at an antenna array of the base station; and transmit, to the user equipment, different portions of the target beam through a plurality of ports based on the target arrangement.

In a second aspect, there is provided a method. The method comprises determining a target beam for carrying a transmission of a reference signal from the base station to the user equipment; determining a target arrangement of the plurality of ports formed at an antenna array of the base station; and transmitting, to the user equipment, different portions of the target beam through a plurality of ports based on the target arrangement.

In a third aspect, there is provided an apparatus comprising means for determining, at a base station, a target beam for carrying a transmission of a reference signal from the base station to the user equipment; means for determining a target arrangement of the plurality of ports formed at an antenna array of the base station; and means for transmitting, to the user equipment, different portions of the target beam through a plurality of ports based on the target arrangement.

In a fourth aspect, there is provided a computer readable medium having a computer program stored thereon which, when executed by at least one processor of a device, causes the device to carry out the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
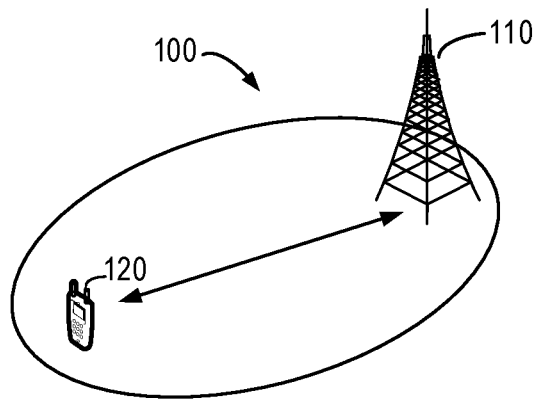
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 comprises a network device 110 (hereafter also referred to as a base station 110 or a gNB 110) and a terminal device 120 (hereafter also referred to as an user equipment 120 or a UE 120). The terminal device 120 may communicate with the network device 110. It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, massive-MIMO technology is one of the important solutions in increasing cell capability for 5G New Radio (NR) system. One of the schemes used for Massive MIMO refers to the Grid of beam (GOB) scheme. Besides GOB scheme, Eigen Beam Based beamforming (EBB) is another scheme that is used in massive-MIMO.

Current solution in MIMO is based on Long-term weight (of both GOB and EBB) which is used for CSIRS mapping and Short-term weight (Precoding Matrix Indicator (PMI) reported by UE) which is used for layer mapping in special multiplexing.

Denote the channel for one specific UE between different Tx antenna $N_t$ and Rx antenna $N_r$ is $H_k$, the transmit signal is $s_k$, the signal in the receiver is $r_k$, the random noise is $n_k$.

$$r_k = H_k * S + n_k \quad (1)$$

If UE could transmit multi layers in this channel, the channel should be decomposed as follows:

$$H_k = U_k I V_k^H \quad (2)$$

where $U_k$ and $V_k^H$ are both orthogonal matrixes, $V_k^H$ is the matrix contains all the eigen vectors. I is the identity matrix. The size of matrix I could be used as the indicator how many layers supported in the channel.

Assume the long-term weight for CSIRS mapping is $B_k$, with CSIRS channel estimate, the signal in the receiver is:

$$r_k = H_k B_k * s + n_k \quad (3)$$

With the common MRC receiver, the estimate signal in the receiver is $\hat{s}_k$ $$\hat{s}_k = (H_k B_k)^H H_k B_k * S(H_k B_k)^H \quad (4)$$

$$\hat{s}_k = B_k^H H_k^H H_k B_k * s \quad (5)$$

After replacing the $H_k$ with the decomposition function:

$$\hat{s}_k = B_k^H (U_k I V_k^H)^H U_k I V_k^H B_k * s \quad (6)$$

$$\hat{s}_k = (V_k^H B_k)^H I (V_k^H B_k) * s \quad (7)$$

If the signal could be transformed with $V_k^H B_k$, the signal in the receiver is transformed with the same matrix:

$$\hat{s}_k = (V_k^H B_k)(V_k^H B_k)^H I (V_k^H B_k)(V_k^H)^H * s \quad (8)$$

$$\hat{s}_k I * s \quad (9)$$

Finally, the signal is parallel received. The short-term weight is used to do this transformation, if the reported PMI $W_k$ matches the transformation matrix $V_k^H B_k$, the signal could be received correctly.

$$V_k^H B_k W_k^H = I \quad (10)$$

The problem is how to resolve the long-term weight $B_k$.

Denote $v_l$ is the eigen vector of the channel $H_k$, $b_n$ is the weight for each CSIRS port, $w_{n,l}$ is the PMI reported by UE for each CSIRS ports and each layer.

$$V_k^H = \begin{bmatrix} v_0 \\ \vdots \\ v_1 \end{bmatrix}, B_k = [b_0 \ \ldots \ b_n], W_k^H = \begin{bmatrix} w_{0,0} & \cdots & w_{0,l} \\ \vdots & \ddots & \vdots \\ w_{n,0} & \cdots & w_{n,l} \end{bmatrix} \quad (11)$$

In 2×2 Mode, there is only one CSIRS ports in each polarization, the transformation matrix is:

$$V_k^H B_k W_k^H = v_0 * b_0 * w_{0,0} = I, s, t \ b_0 = v_0^H \quad (12)$$

It is reasonable that in long-term weight calculation, the first beam of the channel is used to keep the spatial multiplexing results.

However, in 4×4 Mode, there are two CSIRS ports in each polarization, the transformation matrix is:

$$V_k^H B_k W_k^H = \quad (13)$$

$$\begin{bmatrix} v_0 \\ v_1 \end{bmatrix} * [b_0 \ b_1] * \begin{bmatrix} w_{0,0} & w_{0,1} \\ w_{1,0} & w_{1,1} \end{bmatrix} = \begin{bmatrix} v_0 b_0 & v_0 b_1 \\ v_1 b_0 & v_1 b_1 \end{bmatrix} * \begin{bmatrix} w_{0,0} & w_{0,1} \\ w_{1,0} & w_{1,1} \end{bmatrix}$$

In 5G type I codebook design, the PMI matrix is:

$$\begin{bmatrix} w_{0,0} & w_{0,1} \\ w_{1,0} & w_{1,1} \end{bmatrix} = \begin{bmatrix} 1 & 1 \\ e^{j\varphi} & -e^{j\varphi} \end{bmatrix} \quad (14)$$

$$V_k^H B_k W_k^H = \quad (15)$$

$$\begin{bmatrix} v_0 b_0 & v_0 b_1 \\ v_1 b_0 & v_1 b_1 \end{bmatrix} * \begin{bmatrix} w_{0,0} & w_{0,1} \\ w_{1,0} & w_{1,1} \end{bmatrix} = \begin{bmatrix} v_0 b_0 + v_0 b_1 e^{j\varphi} & v_0 b_0 - v_0 b_1 e^{j\varphi} \\ v_1 b_0 + v_1 b_1 e^{j\varphi} & v_1 b_0 - v_1 b_1 e^{j\varphi} \end{bmatrix}$$

With current design in MIMO 4×4:

$$[b_0 \ b_1] = [v_0^H \ v_1^H] \quad (15)$$

$$V_k^H B_k W_k^H = \begin{bmatrix} v_0 v_0^H + v_0 v_1^H e^{j\varphi} & v_0 v_0^H - v_0 v_1^H e^{j\varphi} \\ v_1 v_0^H + v_1 v_1^H e^{j\varphi} & v_1 v_0^H - v_1 v_1^H e^{j\varphi} \end{bmatrix} \quad (16)$$

It can be seen that the off-diagonal parts occupied with $v_1 v_0^H + v_1 v_1^H e^{j\varphi}$, $v_0 v_0^H - v_0 v_1^H e^{j\varphi}$ are always non-zero which means in higher rank transmission, there is always interference between each layers.

Furthermore, 3GPP requests the different CSIRS ports with quasi co-location (QCL) scheme in channel estimation and doppler shift estimation e.g. process, which means different CSIRS ports should have the same estimation results. If different CSIRS ports using different eigen vectors is allowed in the product, this QCL principle is violated.

Therefore, the present disclosure proposes a solution of beamforming scheme in higher rank transmission. In this solution, the gNB may chose a best beam for transmitting the reference signal from the gNB to the UE. To satisfy the QCL principle, the UE may transmit different portions of the selected beam through a plurality of ports. Each of the plurality of ports arranged in a vertical or horizontal direction in an antenna array of the gNB. In this way, a new beamforming method when Massive-MIMO choose higher rank transmission in multi ports communication system is proposed. The gNB would only select the best beam with different halves in the same polarization to keep the QCL principles.

Figure 2:
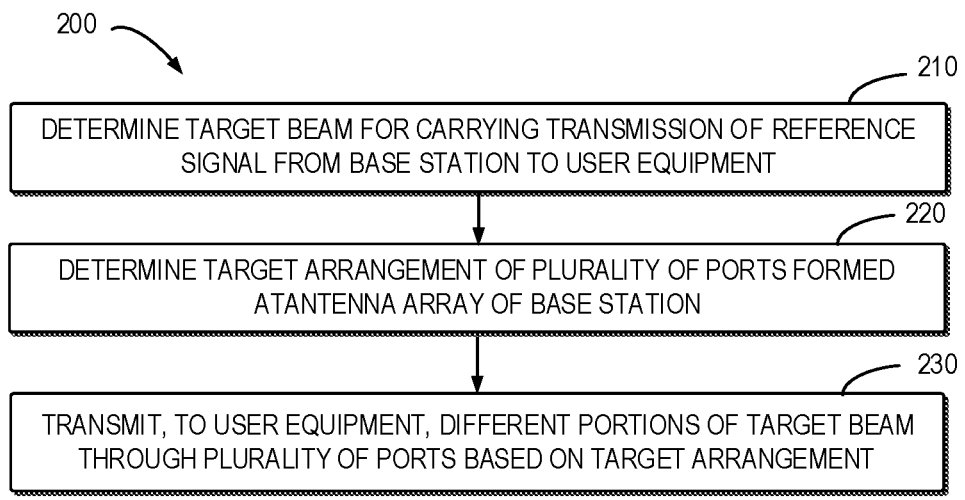
FIG. 2 shows a flowchart of an example method of beamforming scheme in higher rank transmission according to some example embodiments of the present disclosure.

Principle and implementations of the present disclosure will be described in detail below with reference to FIG. 2. FIG. 2 shows a flowchart of an example method 200 of beamforming scheme in higher rank transmission according to some example embodiments of the present disclosure. The method 200 can be implemented at the gNB 110 as shown in FIG. 1. For the purpose of discussion, the method 200 will be described with reference to FIG. 1.

At 210, the gNB 110 may determine a target beam for carrying a transmission of a reference signal from the gNB 110 to the UE 120. Hereinafter the target beam for carry the transmission can be considered as a best beam selected by the gNB 110.

In some example embodiments, to obtain the best beam, the gNB 110 may request the UE 120 to send a Sounding Reference Signal (SRS) to the gNB 110. Based on a measurement on the SRS, the gNB 110 may determine the target beam based on a result of the measurement.

In some example embodiments, the gNB 110 may also transmit a further reference signal to the UE 120. The UE 120 may measure the further reference signal and determine a best receiving beam from the gNB 110. Then the UE 120 may report the indication of the best receiving beam, such as the beam index of the receiving beam, to the gNB 110. Then the gNB 110 may select the receiving beam reported by the UE 120 as the target beam. In this way, the gNB would only select the best beam instead of more beams.

At 220, the gNB 110 may determine a target arrangement of the plurality of ports formed at an antenna array of the gNB 110.

At 230, to keep the QCL principles, the gNB 110 may transmit different portions of the target beam through a plurality of ports based on the determined target arrangement, for example, by mapping the different portions of the target beam to respective ones of a plurality of ports. For example, the plurality of ports can be considered as Channel State Information-Reference Signal (CSI-RS) port at the gNB 110 for transmitting the CSI-RS.

In some example embodiments, each of the plurality of ports are arranged in a vertical or horizontal direction in an antenna array of the gNB 110. In this way, the selected target beam can be map on the different CSIRS ports in the same polarization, i.e. different polarization would share the same beam to keep the QCL principles.

Figure 3:
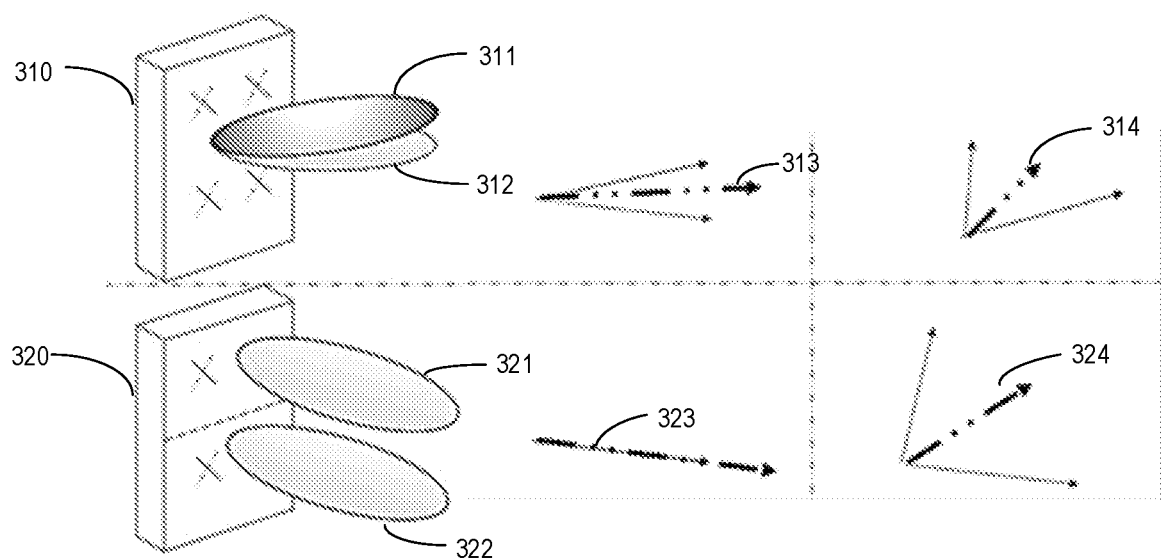
FIG. 3 shows an example of CSI-RS mapping according to some example embodiments of the present disclosure.

FIG. 3 shows an example of CSI-RS mapping according to some example embodiments of the present disclosure. As shown in FIG. 2, for 4×4 Mode, two beams 311 and 312 are transmitted from the antenna array 310 as a conventional way. In this case, it can be seen from the multiplexing layer direction for layer1 313 and for layer2 314, the beams 311 and 312 from the CSI-RS have different directions, which does not follow the QCL principle.

By contrast, if a best beam is mapped to different CSI-RS port with different half of the weight, as shown in FIG. 3 with antenna array 320 and two portions of beams 321 and 322, from CSIRS point of view, this mapping method would keep the same direction between each port, which can be seen from the multiplexing layer direction for layer1 323 and for layer2 324.

In some example embodiments, the gNB 110 may determine a set of candidate arrangements of the plurality of ports by segmenting antennas in the antenna array along at least one of a vertical and a horizontal direction of antenna array and determine a target arrangement of the plurality of ports from the set of candidate arrangements.

For example, for 4×4 mode, in one polarization, there are two CSIRS ports, if kept with the principle QCL, the beams used in these two CSIRS ports should be the same, but it would lead much higher layer interference in the UE receiver. Thus, the CSIRS ports can be mapped with different parts of the beam.

Figure 4A:
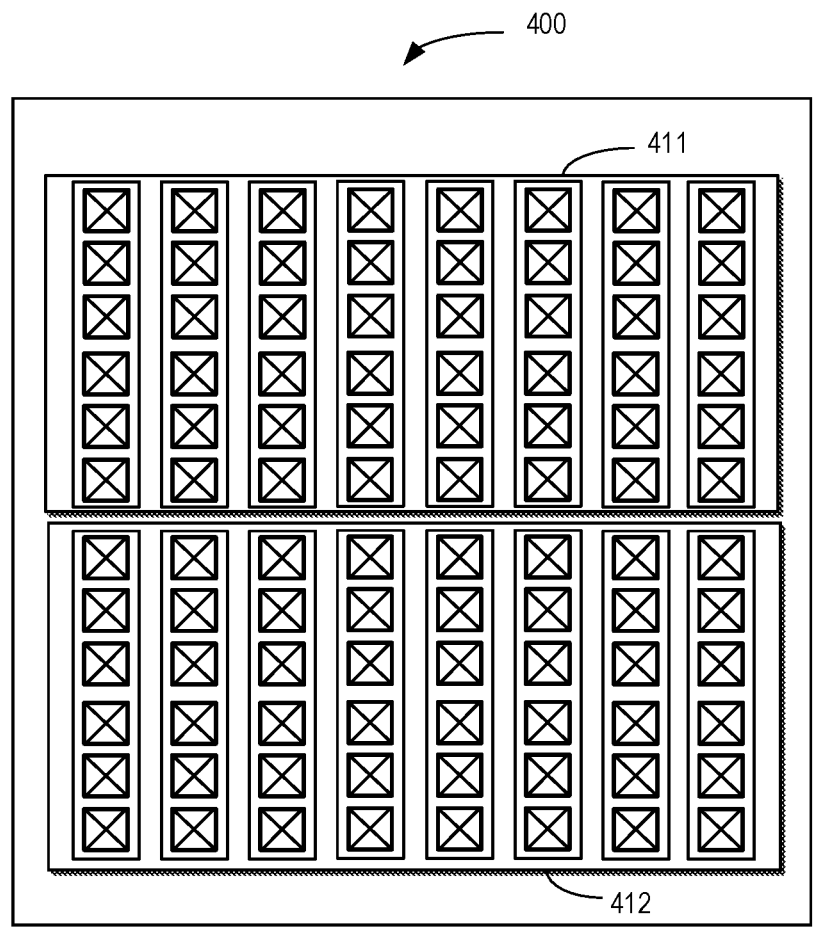
FIGS. 4A and 4B shows examples of candidate port arrangements according to some example embodiments of the present disclosure.
Figure 4B:
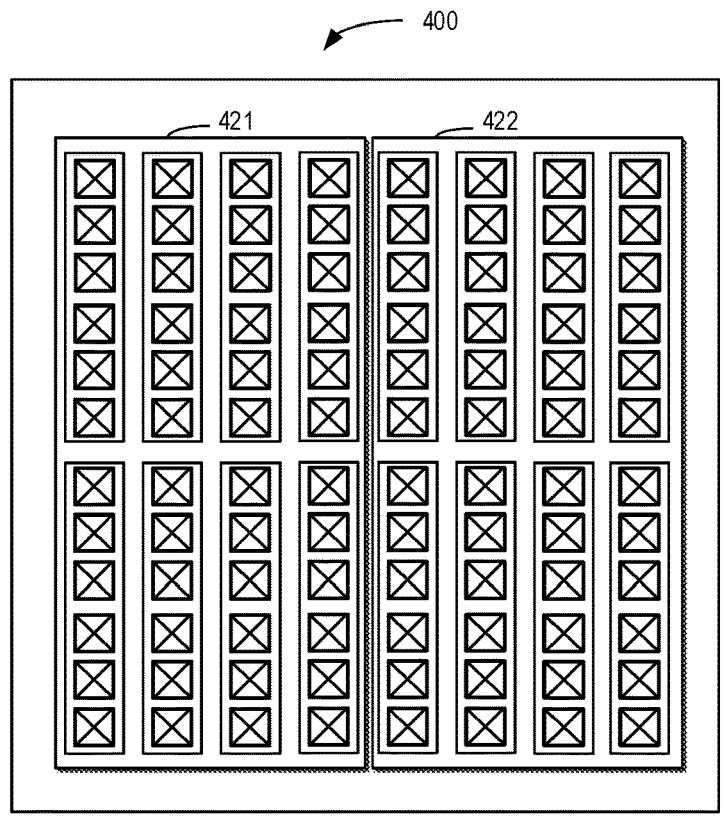

FIGS. 4A and 4B shows examples of candidate port arrangements for 4×4 mode according to some example embodiments of the present disclosure. As shown in FIG. 4A, the antennas at the antenna array 400 can form the first CSI-RS port 411 and the second CSI-RS port 412, while as shown in FIG. 4B, the antennas at the antenna array 400 can form the first CSI-RS port 421 and the second CSI-RS port 422.

Now the problem of the non zero off-diagonal parts, as mentioned above, can be solved as below.

In the example of FIG. 4A, For each CSIRS in the same polarization, the UE would observe the different half panel channels.

$$[b_0 b_1] = [v_{0,top\_half}^H v_{0,bot\_half}^H] \tag{17}$$

For the transformation matrix:

$$V_k B_k W_k^H = \begin{bmatrix} v_0 b_0 + v_0 b_1 e^{j\varphi} & v_0 b_0 - v_0 b_1 e^{j\varphi} \\ v_1 b_0 + v_1 b_1 e^{j\varphi} & v_1 b_0 - v_1 b_1 e^{j\varphi} \end{bmatrix} \tag{18}$$

$$\begin{bmatrix} v_0 v_{0,top_{half}}^H + v_0 v_{0,bot_{half}}^H e^{j\varphi} & v_0 v_{0,top_{half}}^H - v_0 v_{0,bot_{half}}^H e^{j\varphi} \\ v_1 v_{0,top_{half}}^H + v_1 v_{0,bot_{half}}^H e^{j\varphi} & v_1 v_{0,top_{half}}^H - v_1 v_{0,bot_{half}}^H e^{j\varphi} \end{bmatrix} = \tag{19}$$

$$I, \text{ s.t. } v_0 v_{0,top_{half}}^H - v_0 v_{0,bot_{half}}^H e^{j\varphi} = 0$$

The best beam $v_0$ is replaced by the top_half and bottom_half:

$$v_0 = v_{0,top_{half}} + v_{0,bot_{half}} \tag{20}$$

$$v_0 v_{0,top_{half}}^H - v_0 v_{0,bot_{half}}^H e^{j\varphi} = \tag{21}$$

$$\left(v_{0,top_{half}} + v_{0,bot_{half}}\right) v_{0,top_{half}}^H - \left(v_{0,top_{half}} + v_{0,bot_{half}}\right) v_{0,bot_{half}}^H e^{j\varphi}$$

Remove the orthogonal parts in the function:

$$v_0 v_{0,top_{half}}^H - v_0 v_{0,bot_{half}}^H e^{j\varphi} = v_{0,top_{half}} v_{0,top_{half}}^H - v_{0,bot_{half}} v_{0,bot_{half}}^H e^{j\varphi} = 0 \tag{22}$$

Finally find one $e^{j\varphi}$ in PMI to guarantee the interference minimum.

Back to see the other off-diagonal element:

$$v_1 v_{0,top_{half}}^H + v_1 v_{0,bot_{half}}^H e^{j\varphi} = \tag{23}$$

-continued $$v_1 v_{0,top_{half}}^H + v_1 \left( v_{0,bot_{half}}^H v_{0,top_{half}} v_{0,top_{half}}^H \right) =$$

$$v_1 \left( v_{0,top_{half}}^H + v_{0,bot_{half}}^H \right) = v_1 v_0^H$$

If the channel could fine two orthogonal eigen vectors, this off-diagonal element with the PMI co-phasing is perfect 0. For left and right split weigh, as shown in FIG. 4B, the same conclusions can be obtained.

Figure 5A:
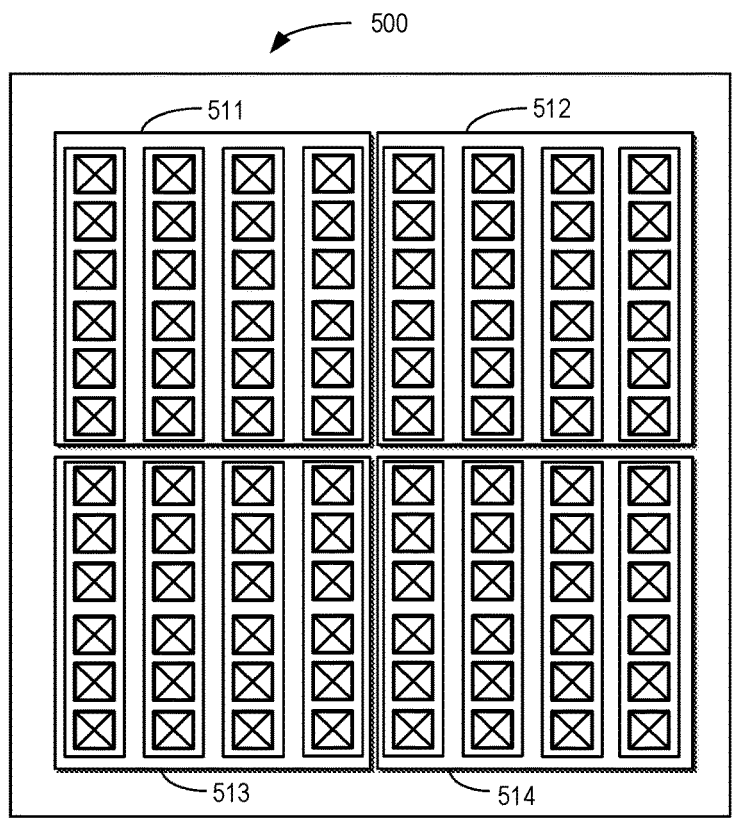
FIGS. 5A-5C shows examples of candidate port arrangements according to some example embodiments of the present disclosure.
Figure 5B:
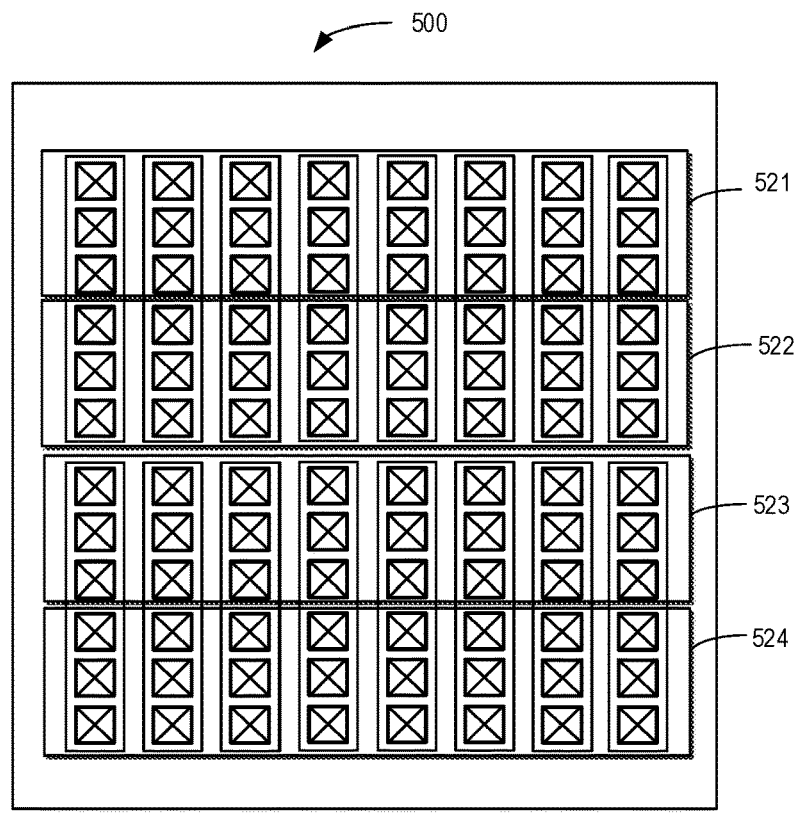
Figure 5C:
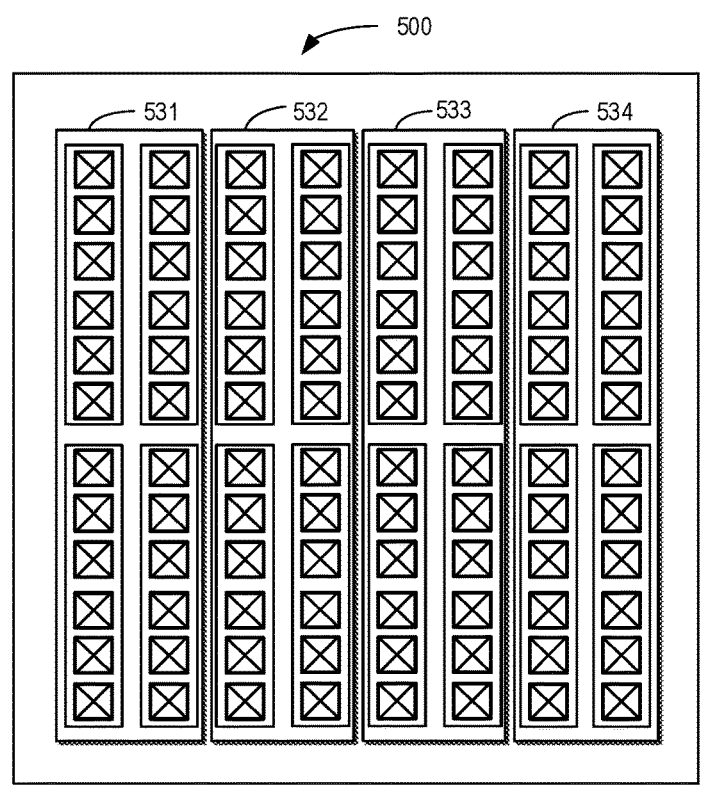

Furthermore, FIGS. 5A-5C shows examples of candidate port arrangements for 8×8 mode according to some example embodiments of the present disclosure. With the same consideration, 8 CSIRS ports mapping with different split method can also be supported with the solution of the present invention, each CSIRS port would observer the same channels with parts of the weight.

Figure 6:
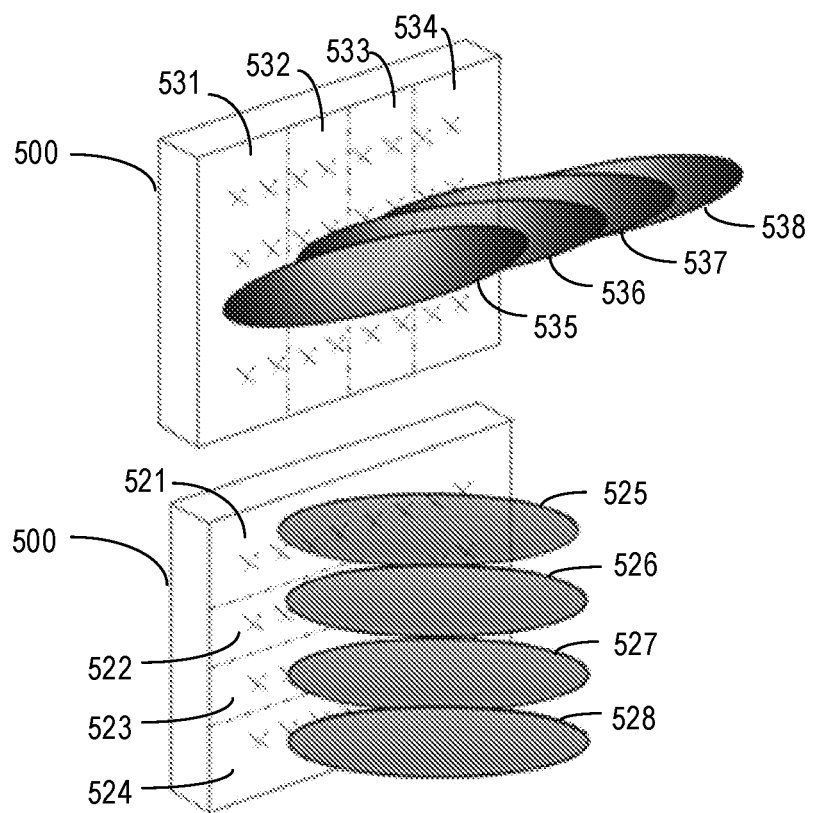
FIG. 6 shows an example of CSI-RS mapping according to some example embodiments of the present disclosure.

FIG. 6 shows an example of CSI-RS mapping according to some example embodiments of the present disclosure. It can be seen from FIG. 6, that the CSI-RS ports 531 to 534 can be formed at the array 500, as an optional port arrangement shown in FIG. 5C, four portions of beams 535-538 are mapped to the CSI-RS ports 531 to 534, respectively. From CSIRS point of view, this mapping method would keep the same direction between each port.

Furthermore, it can also be seen from FIG. 6, that the CSI-RS ports 521 to 524 can be formed at the array 500, as an further optional port arrangement shown in FIG. 4B, four portions of beams 525-528 are mapped to the CSI-RS ports 521 to 524, respectively. From CSIRS point of view, this mapping method would keep the same direction between each port.

In this way, a new beamforming method when Massive-MIMO choose higher rank transmission in multi ports communication system is proposed. the gNB would only select the best beam with different halves in the same polarization to keep the QCL principles. After the split weight multiplied with PMI in each CSIRS ports, different layers (spatial multiplexing) would share the same CSIRS ports and keep the orthogonality between each other.

The other aspect of the present disclosure may refer to how to determine a suitable arrangement for vertical and horizontal ports. As mention above, the gNB 110 may determine a set of candidate arrangements of the plurality of ports in the antenna array based on the number of the plurality of ports and determine a target arrangement of the plurality of ports from the set of candidate arrangements. However, the gNB 110 may not determine which candidate arrangement of ports is the most suitable for the transmission between the gNB 110 and the UE 120.

Referring back to FIGS. 5A-5C, which shows examples of candidate port arrangements for 8×8 mode according to some example embodiments of the present disclosure. Take 8 CSI-RS logic ports for an example, it defines N(1,4) or N(2,2) for the same polarization. N(2,2) is easily understanding that there are both 2 CSIRS logic ports in vertical and horizontal domain, the gNB could separate the same assumptions in the antennas physical panel as FIG. 5A.

But for N(1,4), there are two choices for gNB separating the physical ports as FIGS. 5B and 5C, for different channel in one scheduling slot, the UE could use different choices to transmit data through the ports. But the gNB does not know which type is better for higher layers transmission or which type has higher frequency efficiency.

In some example embodiments, the gNB 110 may transmit a detecting signal through each of the candidate arrangements of the plurality of ports by using different resources.

For example, the gNB 110 may transmit a first detecting signal through the plurality of ports having a first candidate arrangement, for example as shown in FIG. 5B, on a first resource and a second detecting signal through the plurality of ports having a second candidate arrangement, for example as shown in FIG. 5C, on a second resource which is different from the first resource.

After that, the gNB 110 may receive the corresponding channel status information associated with the different resources from UE 110. For example, the gNB 110 may receive first channel status information associated with the first resource and second channel status information associated with the second resource. By comparing the first channel status information and the second channel status information, the gNB 110 may determine a target arrangement from the first candidate arrangement and the second candidate arrangement.

In some example embodiments, the channel status information may be referred to as channel quality information (CQI), if, for example, the gNB 110 determines the first channel quality is higher than the second channel quality, the gNB 110 may determine the first candidate arrangement as the target arrangement.

In some example embodiments, the channel status information may also be referred to PMI reported from the UE. For example, the gNB 110 may determine a first candidate transmit power level for the plurality of ports based on first PMI and a second candidate transmit power level for the plurality of ports based on second PMI. By comparing the first candidate transmit power level with the second candidate transmit power level, the gNB 110 may determine the target arrangement.

Furthermore, in lower speed scenario, the arrangement of ports can be updated. For example, denote the channel estimated from UEk SRS $H_k$, the best eigen vector $e_k$ of the channel could be got from SVD of the covariance matrix $H_k^H H_k$. According to the PMI used in the data transmission, there are N types of logic ports mapping relationship.

For the latest data transmission, the mapping type is $i_{latest}$, $i_{latest} \in N$, the mapping weight is $w_{i_{latest}}$.

Get the reported PMI across power $P_{i_{latest}}$:

$$P_{i_{latest}} = \Sigma_{Logic\ ports} \Sigma_{layers} H_k w_{i_{latest}} \quad (24)$$

Loop all the mapping type i, $i \in N$, $i \neq i_{latest}$, keep the same layer numbers as reported from UE, $$P_i = \Sigma_{Logic\ ports} \Sigma_{layers} H_k w_i \quad (25)$$

Then the strongest power with the chosen combining type $i_{best}$, $i_{best} \in N$ and the PMI can be found. The CS-IRS can be formed with the chosen type and the PMI used in the PDSCH.

In this way, the most suitable arrangement for the port can be determined and the channel between transmitted UE and gNB can be reshaped increase the frequency efficiency.

In some example embodiments, an apparatus capable of performing the method 200 (for example, implemented at the gNB 110) may comprise means for performing the respective steps of the method 200. The means may be implemented in any suitable form. For example, the means may be implemented in a circuitry or software module.

In some example embodiments, the apparatus comprises means for determining, at a base station, a target beam for carrying a transmission of a reference signal from the base station to the user equipment; means for determining a target arrangement of the plurality of ports formed at an antenna array of the base station; and means for transmitting, to the user equipment, different portions of the target beam through a plurality of ports based on the target arrangement.

Figure 7:
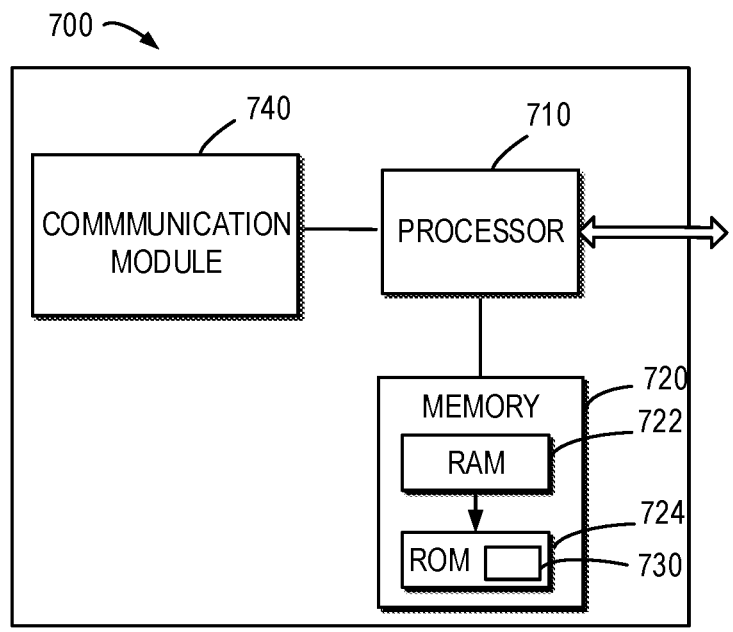
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the gNB 110 as shown in FIG. 1. As shown, the device 700 includes one or more processors 710, one or more memories 740 coupled to the processor 710, and one or more transmitters and/or receivers (TX/RX) 740 coupled to the processor 710.

The TX/RX 740 is for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 2 to 6. The embodiments of the present disclosure may also be implemented by hardware or by a combination of software and hardware.

Figure 8:
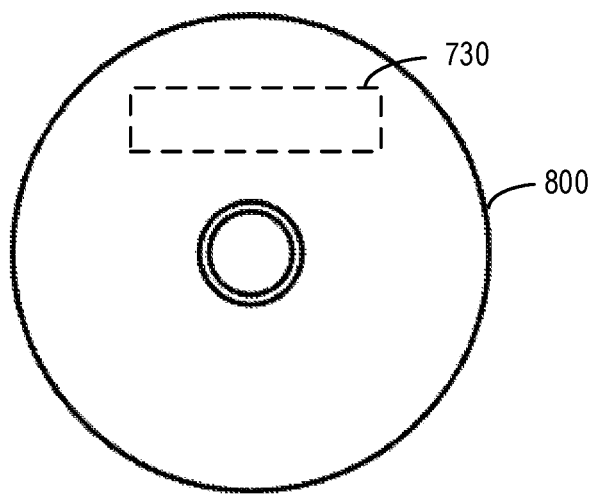
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8. shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 600 as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment.

Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
   at least one processor; and
   at least one memory including computer program code;
   the at least one memory and the computer program code are configured to, with the at least one processor, cause the apparatus to:
   determine a target beam for carrying a transmission of a reference signal from the apparatus to a user equipment, wherein the apparatus is caused to determine the target beam by:
   performing a measurement on a channel for receiving a sounding reference signal configured to be used to determine the target beam based on a result of the measurement from the user equipment; and
   determining the target beam based on the result of the measurement on the sounding reference signal, wherein the target beam is configured to be mapped onto a plurality of channel state information reference signal ports in a same polarization;
   determine a target arrangement of a plurality of ports formed at an antenna array of the apparatus, wherein the apparatus is caused to determine the target arrangement by:
   determining a set of candidate arrangements of the plurality of ports by segmenting antennas in the antenna array along at least one of a vertical direction of the antenna array and a horizontal direction of the antenna array; and
   determining the target arrangement of the plurality of ports from the set of candidate arrangements from a first candidate arrangement based on first channel state information and a second candidate arrangement based on second channel state information; and
   transmit, to the user equipment, different portions of the target beam through the plurality of ports based on the target arrangement.

2. The apparatus of claim 1, wherein the apparatus is caused to determine the target arrangement from the set of candidate arrangements by:
   transmitting, to the user equipment, a first detecting signal through the plurality of ports having the first candidate arrangement in the set of candidate arrangements on a first channel;
   transmitting a second detecting signal through the plurality of ports having the second candidate arrangement in the set of candidate arrangements on a second channel, the second channel being different from the first channel; and
   receiving, from the user equipment, the first channel state information associated with the first channel and the second channel state information associated with the second channel.

3. The apparatus of claim 2, wherein the apparatus is caused to determine the target arrangement from the first and second candidate arrangements based on the first channel state information and the second channel state information by:
   obtaining, from the first channel state information, first channel quality associated with the first channel;
   obtaining, from the second channel state information, second channel quality associated with the second channel;
   comparing the first channel quality with the second channel quality; and
   in accordance with a determination that the first channel quality is higher than the second channel quality, determining the first candidate arrangement as the target arrangement.

4. The apparatus of claim 2, wherein the apparatus is caused to determine the target arrangement from the first and second candidate arrangements based on the first channel state information and the second channel state information by:
   obtaining, from the first channel state information, first precoding matrix indicator associated with the first channel;
   obtaining, from the second channel state information, second precoding matrix indicator associated with the second channel from the second channel state information; and
   determining the target arrangement from the set of candidate arrangements based on the first precoding matrix indicator and the second precoding matrix indicator.

5. The apparatus of claim 1, wherein the apparatus is caused to determine the target beam by:
   transmitting a further reference signal to the user equipment;
   receiving, from the user equipment, an indication that the further reference signal is detected by the user equipment through a reference beam; and
   determining the target beam based on the reference beam.

6. The apparatus according to claim 1, wherein the apparatus comprises a base station in a massive multiple input multiple output system.

7. A method, comprising:
   determining, at a base station, a target beam for carrying a transmission of a reference signal from the base station to a user equipment, wherein the determining the target beam comprises:
   performing a measurement on a channel for receiving a sounding reference signal configured to be used to determine the target beam based on a result of the measurement from the user equipment; and
   determining the target beam based on the result of the measurement on the sounding reference signal, wherein the target beam is configured to be mapped onto a plurality of channel state information reference signal ports in a same polarization;
   determining a target arrangement of a plurality of ports formed at an antenna array of the base station, wherein determining the target arrangement comprises:
   determining a set of candidate arrangements of the plurality of ports by segmenting antennas in the antenna array along at least one of a vertical direction of the antenna array and a horizontal direction of the antenna array; and
   determining the target arrangement of the plurality of ports from the set of candidate arrangements from a first candidate arrangement based on first channel state information and a second candidate arrangement based on second channel state information; and transmitting, to the user equipment, different portions of the target beam through the plurality of ports based on the target arrangement.

8. The method of claim 7, wherein determining the target arrangement from the set of candidate arrangements comprises:

transmitting, to the user equipment, a first detecting signal through the plurality of ports having the first candidate arrangement in the set of candidate arrangements on a first channel;

transmitting a second detecting signal through the plurality of ports having the second candidate arrangement in the set of candidate arrangements on a second channel, the second channel being different from the first channel; and receiving, from the user equipment, the first channel state information associated with the first channel and the second channel state information associated with the second channel.

9. The method of claim 8, wherein determining the target arrangement from the first and second candidate arrangements based on the first channel state information and the second channel state information comprises:

obtaining, from the first channel state information, first channel quality associated with the first channel;

obtaining, from the second channel state information, second channel quality associated with the second channel;

comparing the first channel quality with the second channel quality; and in accordance with a determination that the first channel quality is higher than the second channel quality, determining the first candidate arrangement as the target arrangement.

10. The method of claim 8, wherein determining the target arrangement from the first and second candidate arrangements based on the first channel state information and the second channel state information comprises:

obtaining, from the first channel state information, first precoding matrix indicator associated with the first channel;

obtaining, from the second channel state information, second precoding matrix indicator associated with the second channel from the second channel state information; and determining the target arrangement from the set of candidate arrangements based on the first precoding matrix indicator and the second precoding matrix indicator.

11. The method of claim 7, wherein determining the target beam comprises:

transmitting a further reference signal to the user equipment;

receiving, from the user equipment, an indication that the further reference signal is detected by the user equipment through a reference beam; and determining the target beam based on the reference beam.

12. A non-transitory computer readable medium for a massive multiple input multiple output system comprising program instructions for causing an apparatus to perform at least the method of claim 7.

13. The method according to claim 7, wherein the method is implemented in a massive multiple input multiple output system.

14. An apparatus, comprising:

means for determining, at a base station, a target beam for carrying a transmission of a reference signal from the base station to a user equipment, wherein the determining the target beam comprises:

performing a measurement on a channel for receiving a sounding reference signal configured to be used to determine the target beam based on a result of the measurement from the user equipment; and determining the target beam based on the result of the measurement on the sounding reference signal, wherein the target beam is configured to be mapped onto a plurality of channel state information reference signal ports in a same polarization;

means for determining a target arrangement of a plurality of ports formed at an antenna array of the base station, wherein determining the target arrangement comprises:

determining a set of candidate arrangements of the plurality of ports by segmenting antennas in the antenna array along at least one of a vertical direction of the antenna array and a horizontal direction of the antenna array; and determining the target arrangement of the plurality of ports from the set of candidate arrangements from a first candidate arrangement based on first channel state information and a second candidate arrangement based on second channel state information; and means for transmitting, to the user equipment, different portions of the target beam through the plurality of ports based on the target arrangement.

15. The apparatus according to claim 14, wherein the apparatus is implemented in a massive multiple input multiple output system.

* * * * *